Figure 4:
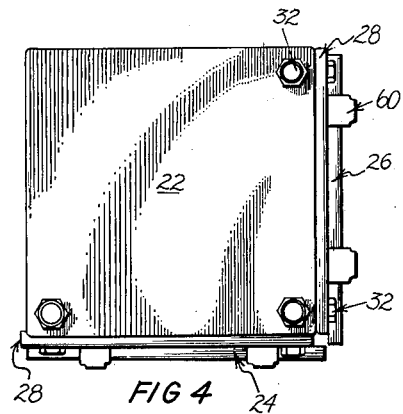

June 26, 1962 V. L. REDDLE ETAL 3,040,622
APPARATUS FOR DUAL IMAGE PROJECTION UPON A SINGLE SCREEN
Filed March 16, 1959 2 Sheets-Sheet 1
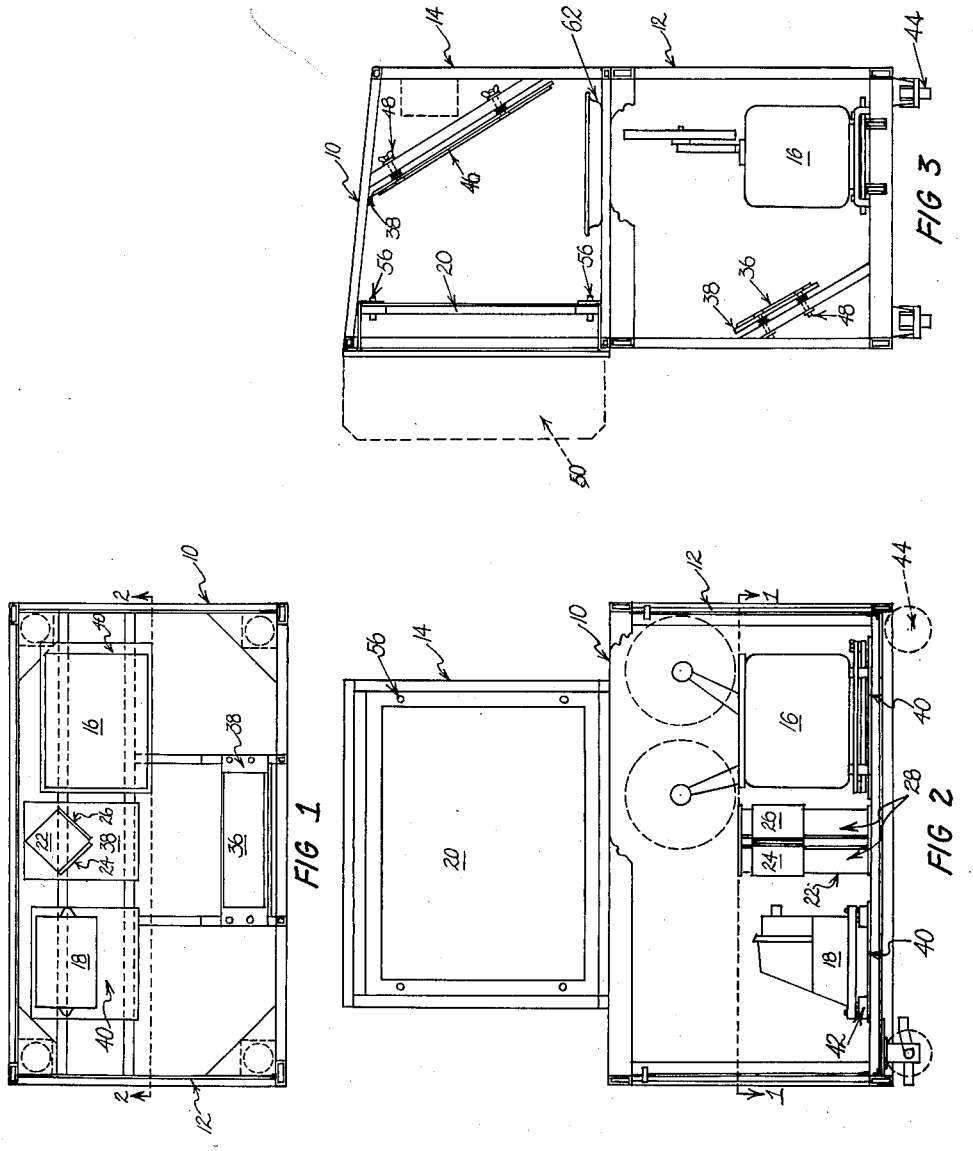
INVENTOR
VICTOR L. REDDLE
KURT H. HOPPMANN
STANLEY F. STAPLES
BY JOHN GIBSON SEMMES
ATTORNEY June 26, 1962 V. L. REDDLE ETAL 3,040,622
APPARATUS FOR DUAL IMAGE PROJECTION UPON A SINGLE SCREEN
Filed March 16, 1959 2 Sheets-Sheet 2

INVENTOR
VICTOR L. REDDLE
KURT H. HOPPMANN
STANLEY F. STAPLES
BY JOHN GIBSON SEMMES
ATTORNEY

3,040,622
APPARATUS FOR DUAL IMAGE PROJECTION UPON A SINGLE SCREEN

Victor L. Reddle, 1709 Tucker Ave., McLean, Va., Kurt H. Hoppmann, 6030 Brook Drive, Falls Church, Va., and Stanley F. Staples, 2916 Mayer Place, Alexandria, Va.
Filed Mar. 16, 1959, Ser. No. 799,788
1 Claim. (Cl. 88—24)

The present invention relates to a cabinet for housing multiplicity of projectors and a visual screen, particularly a rear view reflection apparatus for reflecting onto said screen images cast by said projectors.

At the present time there are employed for instructional, advertising and multifarious purposes unitary cabinets embodying means for synchronized reproduction and presentation of visual and audio phenomena. Such cabinets generally embody a visual screen, loud speakers, tape recorder and a motion picture or slide projector. Usually, the image cast by the projector is reflected in rear view onto the back of an upstanding screen. A principal shortcoming of such devices is the lack of means for fine focusing of the visual image cast upon the screen as well as a space limitation as to the number of projectors which may be employed.

According to the present invention, a multiplicity of motion picture and/or slide projectors are accommodated for alternate rear view projection by means of a unique polygonal mirror mounting positioned intermediate the projectors. These projectors project their images via the same optical track and upon a single screen. Thus, there is provided a more flexible visual presentation at increased economy. The cost of a motion picture presentation is thus reduced, because the movie can be supplemented with slides. An externally operable microphone is provided for erasing of motion picture audio and simultaneously dubbing of "live" narration. The slide projector and microphone controls are coordinated to provide frame advance of the slides and "live" narration of slide projection thru the amplifier circuit of the motion picture projector. Fine adjusting of the mirrors attached to the primary polygonal mirror mounting as well as the secondary rear view mirrors which may be employed, is accomplished by lateral positioning of the plates upon which the mirrors are mounted. The primary and secondary mirrors are arranged to invert for rear view projection the images cast by the projectors which accommodate conventional film, prepared for front view presentation. Uniquely, according to the instant invention, the final optical path to the screen is essentially perpendicular to the screen. In the image cast upon the screen there is zero vertical inclination and only such negligible horizontal inclination as might be composed by the angular disposition of the primary mirrors about the faces of the polygonal mounting. Rear surface mirrors may be employed throughout the instant optical system. However, front surfaced primary mirrors may be employed to minimize a slight "ghost" image which would otherwise appear in fine line or detailed images cast upon the visual screen.

It is an object of the invention, therefore, to provide a cabinet with mirror mount for rear-view projection of the visual images cast by a multiplicity of projectors.

Another object of invention is to provide in a projector apparatus a polygonally-shaped upstanding mirror mounting for accommodating rear-view reflection of a multiplicity of visual images cast by a multiplicity of projectors.

Another object of invention is to provide in a rear-view projection apparatus means for fine focusing of rear-view mirrors employed.

Yet, another object of invention is to provide an economical means for improved audio-visual presentations.

Figure 6:
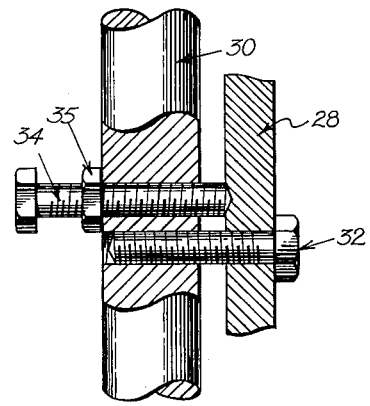
Figure 5:
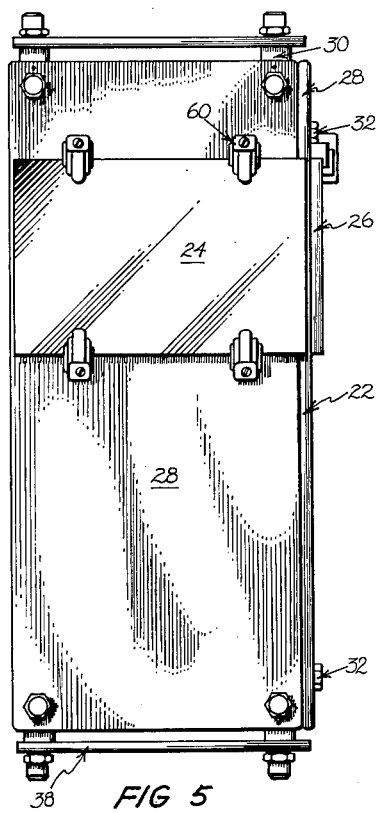
Figure 7:
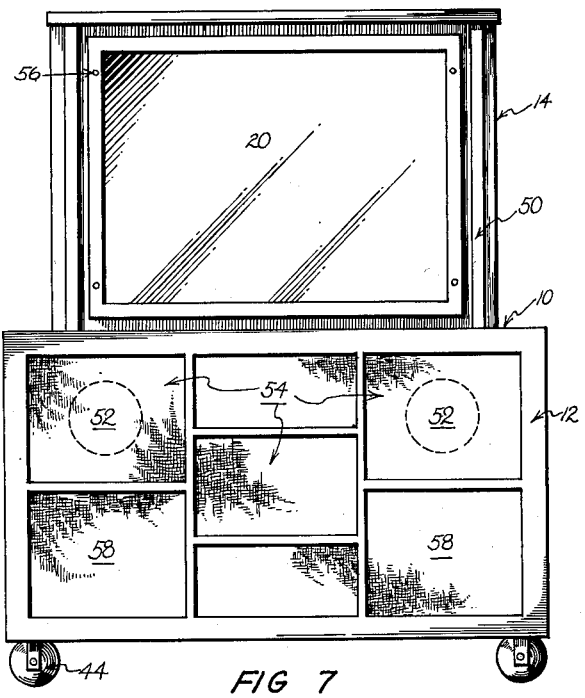

Additional objects of invention will become apparent from the ensuing specification and attached drawings wherein:

FIG. 1 is a plan view of the projector housing, taken along section line 1—1 of FIG. 2, FIG. 2 is a front elevational view, partially in section, of the projector housing and visual screen, FIG. 3 is a side elevation, partially in section, of the projector housing and visual screen, showing adjustable secondary and tertiary rear-view mirrors mounted therebetween, FIG. 4 is a top plan view of the primary reflecting means comprising a polygonal mirror mounting, FIG. 5 is a side elevation thereof, FIG. 6 is an enlarged, fragmentary detail of the bolt and leveling screw mounting of the mirror mounting side plates, and FIG. 7 is a front elevational view of the cabinet, showing exterior detail and wheel mountings.

In FIG. 7 an upstanding cabinet 10 is designated as having lower projection housing 12 and upper screen housing 14. Films and script material may be conveniently stored upon tray 62 mounted in upper screen housing 14. Cabinet 10 may be mounted upon rollers or wheels 44. The cabinet frame may be of welded tubular steel, providing rigidity and thus maintaining optical alignment of mirrors. A vertically disposed plastic screen 20 is mounted by means of pawl fasteners 56 within the screen housing. Plastic screen 20 may have on one side a projection surface constructed of rigid plastic such as that sold under the trademark "Plexiglas." This rigid plastic may be formed to embody anti-static properties and thus reduce the accumulation of dust.

As illustrated also in FIG. 7 speakers 52 may be mounted in the front of projector housing 12 and perforated aluminum screens 54 may serve as cover for the speakers as well as portals for ventilation of the entire cabinet. In lieu of or in addition to cabinet-mounted speakers 52, external or room-positioned speakers might be utilized through switch and socket means (not illustrated). Forced-air ventilation may be provided by mounting conventional fan means within cabinet 10. Unit controls (not illustrated), may be mounted upon removable front panels 58 and afford complete operational control of the projectors. Actual loading of the projectors is accomplished by sliding doors or the like positioned in the rear of housing 12. Through the use of jack means (not illustrated) mounted in housing 12, coordinated microphone and slide and/or projector controls might be attached at the end of a flexible cable. This attachment will permit the operator to stand away from the housing during presentation.

As illustrated in FIG. 2, a moving projector 16 and a slide projector 18 may be oppositely mounted within projector housing 12. Both projectors may be secured to mounting sockets 42 which, in turn, are fastenable to projector support plates 40. Since conventional motion picture film is employed, unusual threading of the film, as in the case of most conventional rear view projector apparatus, is not required.

Intermediately disposed between the projectors is the primary reflecting means including polygonal mirror mount 22. Rear view front surface mirrors 24 and 26, are adjustably mounted on adjoining mirror mount side plates 28, so as to reflect alternately or simultaneously images cast by the opposed projectors.

Polygonal mirror mount 22 is illustrated in FIGS. 4 through 6, as comprising tubular frame members 30 to which are fastened mirror mount side plates 28. Front surface mirrors 24 and 26 are removably fastened to mirror mount side plates 28 by means of screw-fastened brackets 60. Mirror mount side plates 28 are laterally adjustable, as illustrated in FIG. 6 by means of levelling screws 32, 34 and levelling screw nut 35.

As illustrated in FIGS. 1 and 3, secondary, rear surface mirror 36 is obliquely mounted against the front of projector housing 12 upon mirror backing plate 38. A tertiary, rear surface mirror 46 is obliquely mounted upon mirror backing plate 38 in the rear of screen housing 14. Both secondary and tertiary mirror backing plates 38 are adjustable laterally by means of screws 48 having knurled locknuts 49. The lateral adjustment of plates 38 as well as plates 28 (upon the polygonal mount 22) provide fine focusing of the visual images cast upon screen 20.

As will be apparent, images cast by projectors 16 and 18 are reflected in rear view upon secondary mirror 36 and thence upon tertiary mirror 46 and onto plastic screen 20.

As indicated in FIGS. 3 and 7 screen housing 14 may embody a side hood 50 secured by means of piano hinges or the like (not illustrated) to the side of screen housing 14. Similarly, a top hood (not illustrated) may be hingedly secured to the top front of screen housing 14.

The sides of the projector and screen housings may be constructed of removable plywood panels, thus facilitating adjustment of projectors, mirrors and audio equipment secured within the respective housings. Perforated aluminum screen panels 54 may be alternately disposed with respect to plywood panels 58 for providing abundant ventilation of the projector housing. As will be apparent considerably more than two projectors may be mounted in the projector housing 12 by providing additional primary mirrors upon the side plates 28 of polygonal mirror mounting 22. Manifestly, the device is adaptable for unmonitored operation in daylight or darkened conditions. Projectors employed may be for purposes of illustration, a 16 millimeter motion picture and a slide projector for 2" by 2" slide transparencies or 35 millimeter film strips.

Having thus described the present invention, without specific limitation thereto, the following is claimed:

In a cabinet having a lower projection portion, at least two projection components supported on the floor of said projection portion and an upper visual screen portion, having a screen mounted in the front of said visual screen portion; a primary reflecting means comprising front surface mirrors laterally adjustably fixed to an upstanding mount of polygonal cross section positioned intermediate said projection components and vertically extending side plates supported upon said mount and transversely adjustable with respect to said mount by means traversing said plates and said mount, at least two reflecting mirrors fixed to adjoining plates, said mirrors being inclined towards each other and each being positioned respectively in the path of light from each of said projection components; a secondary reflecting means comprising a front surface mirror adjustably inclined in the lower projection portion of said cabinet between said floor and the front of said cabinet in the path of light of said mirrors comprising the primary reflecting means so as to reflect upwardly images reflected by said primary reflecting means; a tertiary reflecting means comprising a rear surface mirror adjustably inclined in the upper screen portion between the rear and top of said cabinet in the path of light of said front surface mirror comprising the secondary reflecting means so as to reflect images reflected by said secondary reflecting means horizontally against said screen in the front of said cabinet.

References Cited in the file of this patent
UNITED STATES PATENTS

| | | |
|---|---|---|
| 1,954,787 | Bright et al. | Apr. 17, 1934 |
| 2,198,815 | Haskin | Apr. 30, 1940 |
| 2,477,923 | Fitt | Aug. 2, 1949 |
| 2,487,875 | Hutchison | Nov. 15, 1949 |
| 2,525,957 | Schuler | Oct. 17, 1950 |
| 2,611,296 | Pribus | Sept. 23, 1952 |
| 2,754,722 | Howell et al. | July 17, 1956 |